(12) United States Patent
Shih

(10) Patent No.: US 9,156,523 B2
(45) Date of Patent: Oct. 13, 2015

(54) HYDRAULIC BRAKE ADJUSTING DEVICE

(71) Applicant: Guan-Yu Shih, Changhua (TW)

(72) Inventor: Guan-Yu Shih, Changhua (TW)

(73) Assignee: Tektro Technology Corporation, Changhua (TW)

( * ) Notice: Subject to any disclaimer, the term of this patent is extended or adjusted under 35 U.S.C. 154(b) by 0 days.

(21) Appl. No.: 14/261,422

(22) Filed: Apr. 25, 2014

(65) Prior Publication Data

US 2014/0231202 A1 Aug. 21, 2014

(30) Foreign Application Priority Data

Nov. 20, 2013 (TW) .............................. 102221644 U

(51) Int. Cl.
*B62L 3/02* (2006.01)
*B60T 7/10* (2006.01)
*B60T 11/10* (2006.01)

(52) U.S. Cl.
CPC . *B62L 3/023* (2013.01); *B62L 3/02* (2013.01); *B60T 7/10* (2013.01); *B60T 11/10* (2013.01)

(58) Field of Classification Search
CPC ........... B62L 3/02; B62L 3/023; B62L 3/026; B62K 23/06; B60T 7/10; B60T 11/10; B60T 11/102
USPC ......................................................... 188/344
See application file for complete search history.

(56) References Cited

U.S. PATENT DOCUMENTS

| | | | |
|---|---|---|---|
| 7,857,112 B1 * | 12/2010 | Tsai et al. ...................... | 188/344 |
| 2005/0199450 A1 * | 9/2005 | Campbell et al. .......... | 188/24.15 |
| 2009/0120751 A1 * | 5/2009 | Lin et al. ........................ | 188/344 |
| 2012/0152673 A1 * | 6/2012 | Wang ............................. | 188/344 |
| 2012/0199432 A1 * | 8/2012 | Tsai ............................... | 188/344 |
| 2014/0060987 A1 * | 3/2014 | Miles ............................. | 188/344 |

* cited by examiner

*Primary Examiner* — Vishal Sahni

(57) ABSTRACT

A hydraulic brake adjusting device is provided. The mechanical advantage may be automatically increased by pressed the handlebar by riders and then increased the angle lead by the leading plate(s). Thereby, it may simplify structure, be easy to operate, and be capable of automatically adjusting mechanical advantage while riding. Furthermore, the distance between the O-ring on the tube and the through hole of the piston may be adjusted by the screw barrel to make the convex portion push against the tube, the piston, and the push rod.

2 Claims, 6 Drawing Sheets

HYDRAULIC BRAKE ADJUSTING DEVICE

BACKGROUND OF THE INVENTION

1. Field of the Invention

The invention relates to a bicycle, and more particularly to a hydraulic brake adjusting device of a bicycle.

2. Description of Related Art

A conventional master cylinder assembly includes a cylinder body, a piston member operably fitted therein, and a pressure valve assembly to establish a variable fluid output upon operation of the piston member. The cylinder body includes two or more pressure chambers to hold hydraulic fluid, each having a transfer port. The piston member includes two or more pistons respectively received in the pressure chambers, and is operable to move the pistons, in parallel, to transfer hydraulic fluid through the transfer ports. The pressure valve assembly includes a selector and is operable to direct fluid transferred through selected transfer ports out of the cylinder body through an outlet port by means of a movable valve member that establishes a passageway communicating the selected transfer ports with the outlet port. A pivot adjustment mechanism allows adjustment of the lever's mechanical advantage, and a stroke adjustment mechanism allows adjustment of the lever's rest position.

That is, the mechanical advantage should be adjusted before riding and even is not able to be adjusted automatically while riding. And the grip feeling and the grip distance of the handlebar cannot be adjusted. Besides, the above structure is complicated and inconvenient to be operated.

Thus, the need for improvement still exists.

SUMMARY OF THE INVENTION

It is therefore one object of the invention to provide a hydraulic brake adjusting device comprising a hydraulic cylinder, having a hollow cavity, one end of the hydraulic cylinder is extending upwardly to form a bifurcation, two through holes are passed through the bifurcation, the end of the hydraulic cylinder adjacent to the bifurcation is formed a first stop ring, the end of the hydraulic cylinder away from the bifurcation is formed a second stop ring; a piston, passing through the cavity of the hydraulic cylinder and located between the first stop ring and the second stop ring, the piston includes a rod portion, a ring portion, and a head portion, the head portion is connected to one end of the rod portion adjacent to the bifurcation, the ring portion is arranged around the rod portion and spaced apart from the head portion, a blind hole is formed inwardly at the end of the rod portion away from the bifurcation, and a V-shaped ring is sleeved between the head portion and the ring portion; a tube, movably plugged inside the hollow cavity of the hydraulic cylinder, sleeved on the end of the rod portion having the blind hole, and located between the second stop ring and the ring portion of the piston, the tube includes an oil hole; an elastic member, sleeved on the rod portion of the piston, and two ends of the elastic member are respectively against the tube and the ring portion of the piston; a handlebar, pivotably connected to the Bifurcation, the handlebar includes a U-shaped connecting portion, a pivot rod, and a handle portion, the handle portion is pivotably connected to the U-shaped connecting portion through the pivot rod, two ends of the pivot rod are exposed and passed through the bifurcation, two cylindrical holes are formed at the U-shaped connecting portion and pivotably connected to the bottom of the bifurcation through a transmission member; a push rod, disposed between the piston and the handlebar, one end of the push rod is against the head portion of the piston and the other end of the push rod is against the handle portion of the handlebar; and an adjusting member, disposed at the end of the hydraulic cylinder away from the Bifurcation, the adjusting member includes a plug and a screw barrel, the plug includes a convex portion, a shoulder portion, and an outer thread rod portion, the shoulder portion is disposed between the outer thread rod portion and the convex portion, the plug is disposed inside the end of the hydraulic cylinder adjacent to the second stop ring and against the second stop ring with the shoulder portion, the convex portion is against the end of the tube away from the elastic member, the screw barrel includes an inner threaded portion, a ring portion, and a hexagonal portion, the inner threaded portion is screwed at the outer thread rod portion of the plug. The above and other objects, features and advantages of the invention will become apparent from the following detailed description taken with the accompanying drawings.

DETAILED DESCRIPTION OF THE INVENTION

Figure 1:
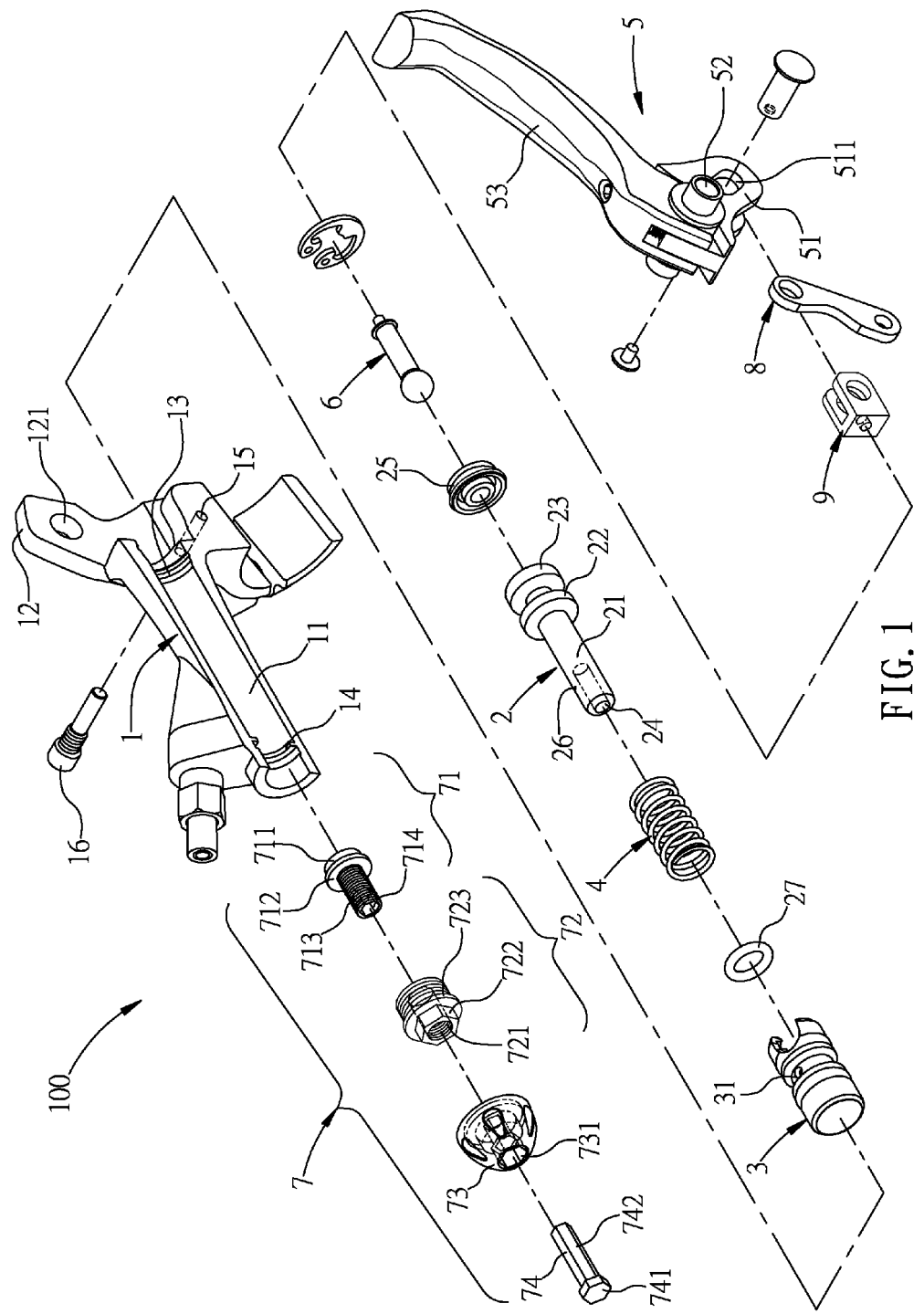
FIG. 1 is an exploded view of a first embodiment of a hydraulic brake adjusting device according to the invention.
Figure 2:
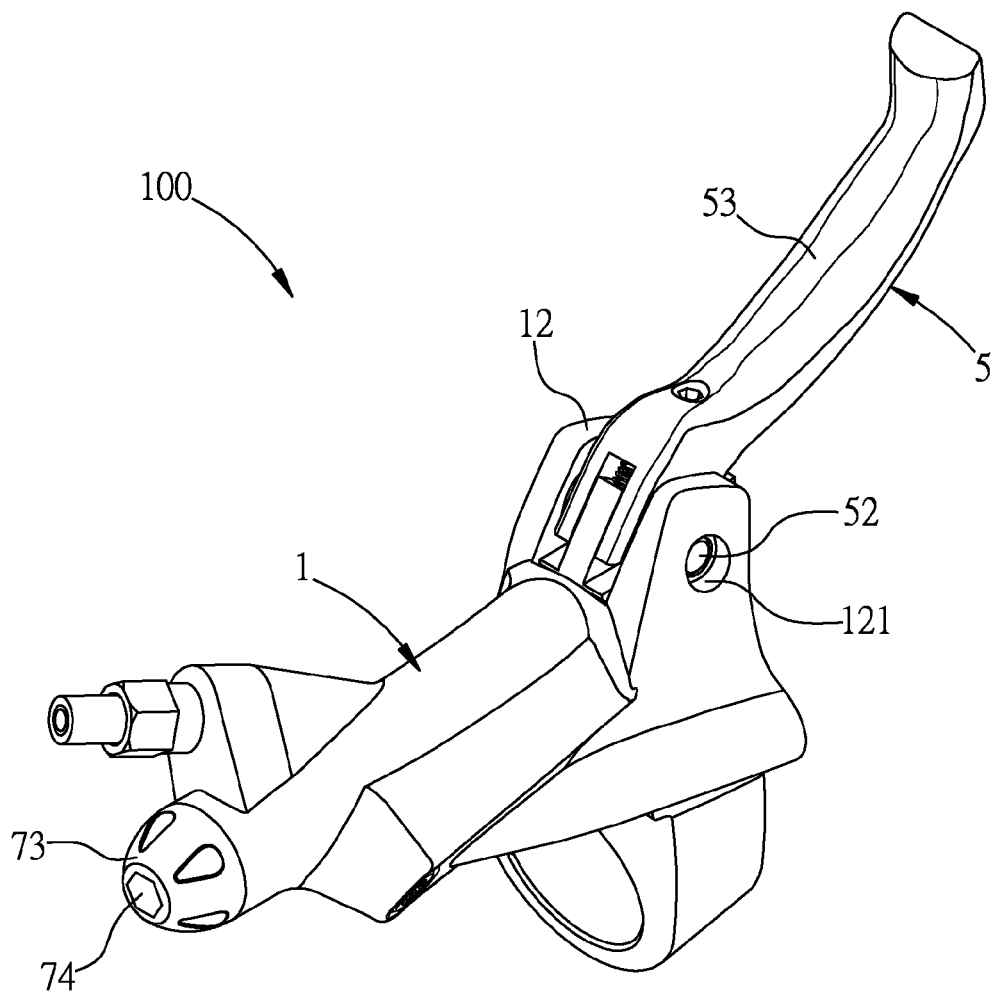
FIG. 2 is an outside view of the first embodiment of the hydraulic brake adjusting device according to the invention.
Figure 3:
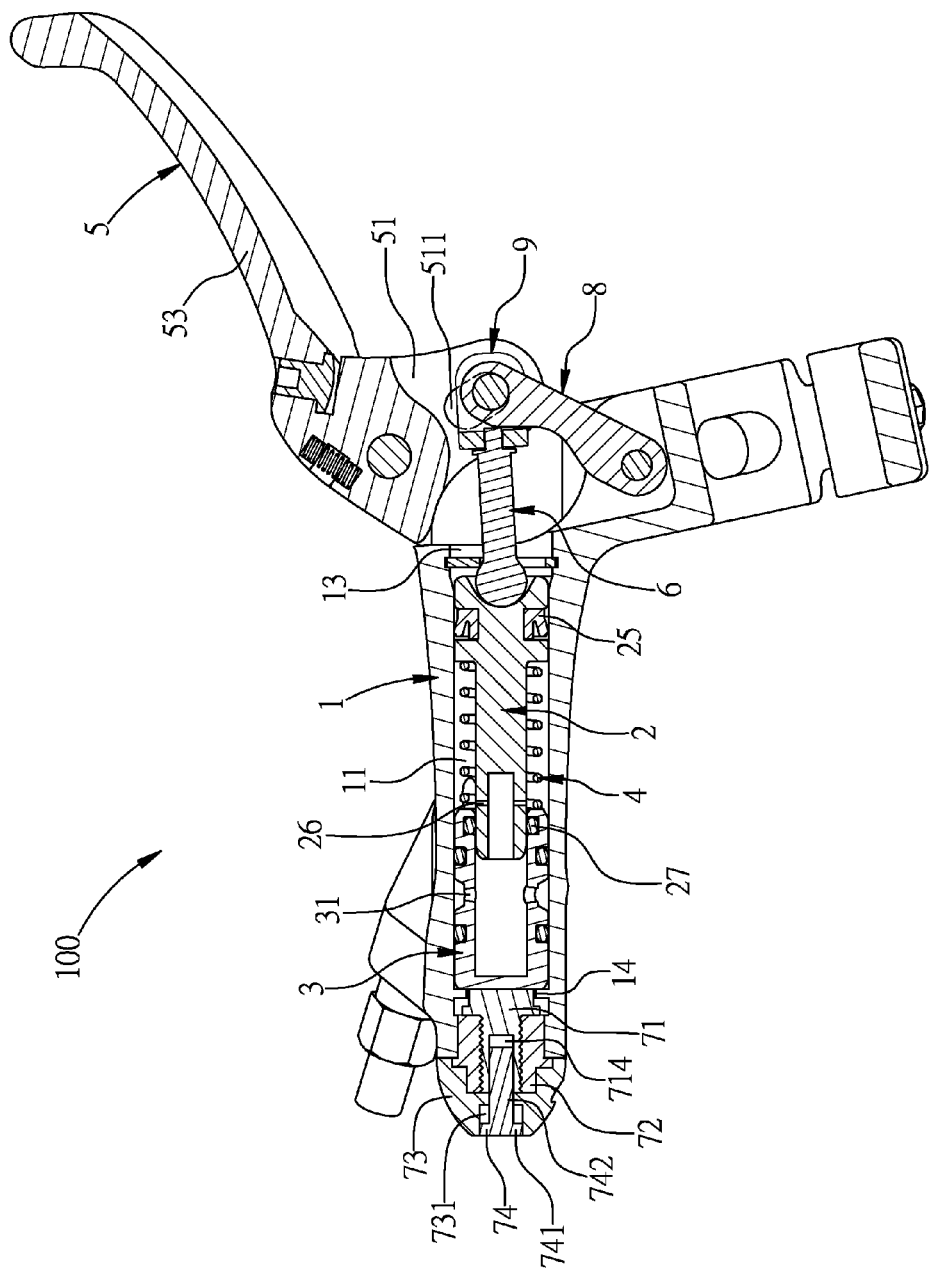
FIG. 3 is a cross section view of the first embodiment of the hydraulic brake adjusting device according to the invention before pressing handle portion.
Figure 4:
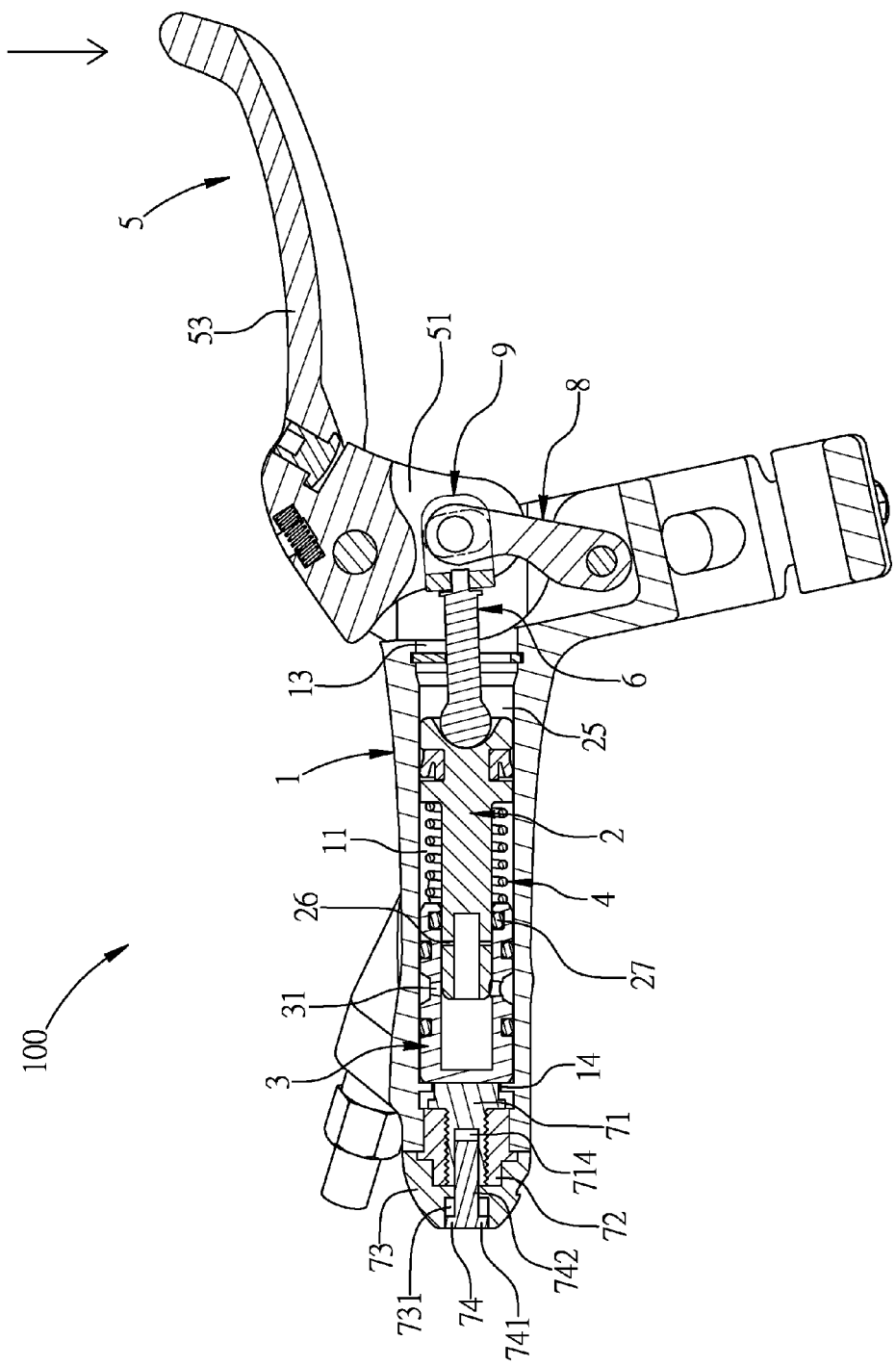
FIG. 4 is a cross section view of the first embodiment of the hydraulic brake adjusting device according to the invention after pressing handle portion.
Figure 5:
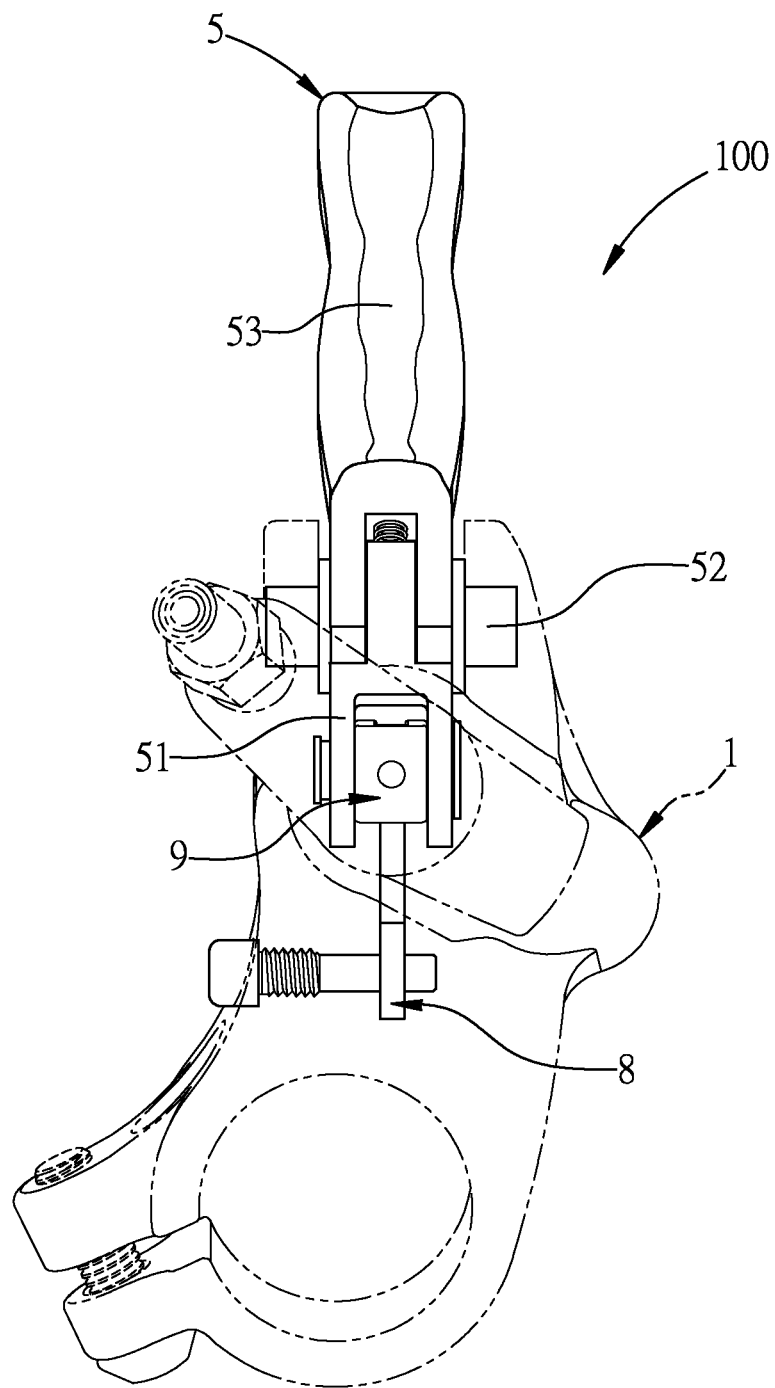
FIG. 5 is a top view of the first embodiment of the hydraulic brake adjusting device according to the invention.

Referring to FIGS. 1 to 5, a hydraulic brake adjusting device 100 in accordance with the invention comprises a hydraulic cylinder 1, a piston 2, a tube 3, an elastic member 4, a handlebar 5, a push rod 6, and an adjusting member 7.

The hydraulic cylinder 1 may have a hollow cavity 11. One end of the hydraulic cylinder 1 is extending upwardly to form a bifurcation 12. Two through holes 121 are passed through the bifurcation 12. The end of the hydraulic cylinder 1 adjacent to the bifurcation 12 is formed a first stop ring 13 and the end of the hydraulic cylinder 1 away from the bifurcation 12 is formed a second stop ring 14.

The piston 2 may be passing through the cavity 11 of the hydraulic cylinder 1 and located between the first stop ring 13 and the second stop ring 14. The piston 2 includes a rod portion 21, a ring portion 22, and a head portion 23. The head portion 23 is connected to one end of the rod portion 21 adjacent to the bifurcation 12. The ring portion 22 is arranged around the rod portion 21 and spaced apart from the head portion 23. A blind hole 24 is formed inwardly at the end of the rod portion 21 away from the bifurcation 12 and a V-shaped ring 25 is sleeved between the head portion 23 and the ring portion 22.

The tube 3 may be movably plugged inside the hollow cavity 11 of the hydraulic cylinder 1, sleeved on the end of the rod portion 21 having the blind hole 24, and located between the second stop ring 14 and the ring portion 22 of the piston 2. The tube 3 may include an oil hole 31.

An O-ring 27 may be sleeved outside of the end of the piston 2 adjacent to the tube 3. The piston 2 may further include a through hole 26 fluidly connected to the blind hole 24. The through hole 26 may be disposed adjacent to the O-ring 27 and located at the side of the O-ring 27 away from the tube 3. The through hole 26 may be fluidly connected to the inside of the tube 3 and the cavity 11. The elastic member 4 may be a compression spring, but not limited thereto. The elastic member 4 may be sleeved on the rod portion 21 of the piston 2. Two ends of the elastic member 4 are respectively against the tube 3 and the ring portion 22 of the piston 2.

The handlebar 5 may be pivotably connected to the Bifurcation 12. The handlebar 5 includes a U-shaped connecting portion 51, a pivot rod 52, and a handle portion 53.

The handle portion 53 may be pivotably connected to the U-shaped connecting portion 51 (and pivoted with the two through 121) through the pivot rod 52. Two ends of the pivot rod 52 are exposed and passed through the through hole 121 arranged at upper section of the bifurcation 12. Two cylindrical-shaped hole 511 may be formed at the U-shaped connecting portion 51. The U-shaped connecting portion 51 may be pivotably connected to the bottom of the bifurcation through a transmission member.

In this embodiment, the transmission member is a single leading plate 8. One end of the leading plate 8 may be pivotably connected to the U-shaped connecting portion 51 through a U-shaped cover 9 and located in the U-shaped connecting portion 51. And the other end of the leading plate 8 may be pivotably connected to a pivot shaft 16 passed through two pivot holes 15 formed at the lower section of the bifurcation 12 and located in the bifurcation 12. Therefore, when pressing the handle portion 53, the pivot shaft 16 and the pivot rod 52 may be two pivot points to automatically adjust mechanical advantage.

Figure 6:
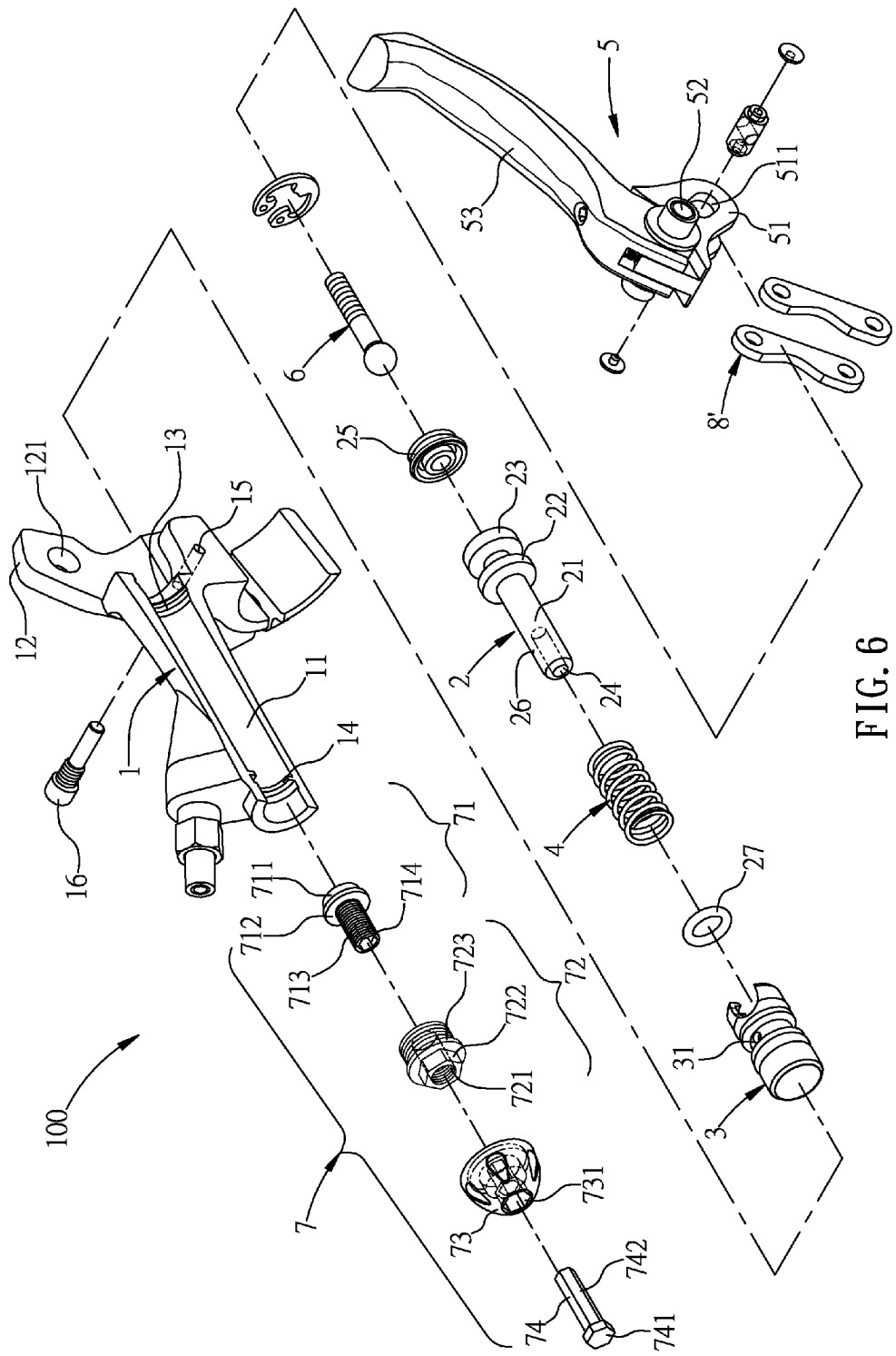
FIG. 6 is an exploded view of a second embodiment of the hydraulic brake adjusting device according to the invention.

Referring to FIG. 6, a hydraulic brake adjusting device 100 in accordance with a second preferred embodiment of the invention is shown. The characteristics of the second preferred embodiment are substantially the same as that of the first preferred embodiment except the following:

The transmission member is two leading plates 8' in this embodiment. One end of each leading plate 8' may be pivotably connected to the U-shaped connecting portion 51 and the U-shaped connecting portion 51 may be located between two leading plates 8', and the other end of each leading plates 8' may be pivotably connected to the pivot shaft 16 passed through two pivot holes 15 formed at the lower section of the bifurcation 12 and located in the bifurcation 12. Therefore, when pressing the handle portion 53, the pivot shaft 16 and the pivot rod 52 may be two pivot points to automatically adjust mechanical advantage.

The push rod 6 may be disposed between the piston 2 and the handlebar 5. One end of the push rod 6 is against the head portion 23 of the piston 2 and the other end of the push rod 6 is against the handle portion 53 of the handlebar 5.

The adjusting member 7 may be disposed at the end of the hydraulic cylinder 1 away from the bifurcation 12. The adjusting member 7 may include a plug 71 and a screw barrel 72. The plug 71 may include a convex portion 711, a shoulder portion 712, and an outer thread rod portion 713. The shoulder portion 712 may be disposed between the outer thread rod portion 713 and the convex portion 711. The plug 71 may be disposed inside the end of the hydraulic cylinder 1 adjacent to the second stop ring 14 and against the second stop ring 14 with the shoulder portion 712. The convex portion 711 may be against the end of the tube 3 away from the elastic member 4. The screw barrel 72 may include an inner threaded portion 721, a ring portion 722, and a hexagonal portion 723. The inner threaded portion 721 may be screwed at the outer thread rod portion 713 of the plug 71. A hexagonal wrench (not shown) may be used for turning over the hexagonal portion 723 of the screw barrel 72.

Besides, the adjusting member 7 may further comprise a turning cover 73 and a transmission post 74. The turning cover 73 may be pivotably sleeved on the screw barrel 72. The turning cover 73 may include a hexagonal hole 731. And the transmission post 74 may include a hexagonal head portion 741 and a hexagonal body portion 742 connected with each other. The hexagonal head portion 741 may be embedded to the hexagonal hole 731 of the turning cover 73, and the hexagonal body portion 742 may be passed through the screw barrel 72 and inserted in the hexagonal hole 714 of the plug 71. When turning over the turning cover 73, the hexagonal hole 731 of the turning cover 73 may be used for driving the hexagonal head portion 741 of the transmission post 74 to be turned, and the hexagonal head portion 741 of the transmission post 74 is turning and the hexagonal body portion 742 of the transmission 74 is turning at the same time. Further, the plug 71 may be driven to turn through the cooperation of the outer thread rod portion 713 of the plug 71 and the inner threaded portion 721 of the screw barrel 72, and then to adjust the distance of the tube 3 and the through hole 26 of the piston 2.

The mechanical advantage may be automatically increased by pressed the handlebar by riders and then increased the angle lead by the leading plate(s). Thereby, it may achieve the effective of simplified structure, easy to operate, and automatically adjusting mechanical advantage while riding. Furthermore, the distance between the O-ring 27 on the tube 3 and the through hole 26 of the piston 2 may be adjusted by the screw barrel 73 to make the convex portion 711 push against the tube 3, the piston 2, and the push rod 6 to adjust grip feeling of the handlebar 5.

While the invention has been described in terms of preferred embodiments, those skilled in the art will recognize that the invention can be practiced with modifications within the spirit and scope of the appended claims.

What is claimed is:

1. A hydraulic brake adjusting device, comprising:
a hydraulic cylinder including a cavity wherein one end of the hydraulic cylinder is formed with a bifurcation extending therefrom, two through holes are passed through the bifurcation, one end of the hydraulic cylinder adjacent to the bifurcation is formed with a first stop ring, and an other end of the hydraulic cylinder away from the bifurcation is formed with a second stop ring;
a piston passing through the cavity of the hydraulic cylinder and located between the first stop ring and the second stop ring, the piston including a rod portion, a ring portion, and a head portion wherein the head portion is connected to one end of the rod portion adjacent to the bifurcation, the ring portion is arranged around the rod portion and spaced apart from the head portion, a blind hole is formed inwardly at an other end of the rod portion away from the bifurcation, and a V-shaped ring is sleeved between the head portion and the ring portion;
a tube movably plugged inside the cavity of the hydraulic cylinder, sleeved on one end of the rod portion including the blind hole, and located between the second stop ring and the ring portion of the piston, the tube including an oil hole;
an elastic member sleeved on the rod portion of the piston wherein two ends of the elastic member are against the tube and the ring portion of the piston respectively;
a handlebar pivotably connected to the bifurcation, the handlebar including a U-shaped connecting portion, a pivot rod, and a handle portion pivotably connected to the U-shaped connecting portion through the pivot rod wherein two ends of the pivot rod are exposed and passed through the bifurcation, and two cylindrical holes are formed at the U-shaped connecting portion and pivotably connected to a bottom of the bifurcation through a transmission member;

a push rod disposed between the piston and the handlebar wherein one end of the push rod is against the head portion of the piston and an other end of the push rod is against the handle portion of the handlebar; and an adjusting member disposed at the other end of the hydraulic cylinder away from the bifurcation, the adjusting member including a plug and a screw barrel;

wherein the plug includes a convex portion, a shoulder portion, and an outer thread rod portion;

wherein the shoulder portion is disposed between the outer thread rod portion and the convex portion;

wherein the plug is disposed inside the other end of the hydraulic cylinder adjacent to the second stop ring and against the second stop ring with the shoulder portion;

wherein the convex portion is against one end of the tube away from the elastic member;

wherein the screw barrel includes an inner threaded portion, a ring portion, and a hexagonal portion;

wherein the inner threaded portion is screwed at the outer thread rod portion of the plug; and wherein the adjusting member further comprises a turning cover and a transmission post, the turning cover is pivotably sleeved on the screw barrel, the turning cover includes a hexagonal hole, and the transmission post includes a hexagonal head portion and a hexagonal body portion connected to each other, the hexagonal head portion is embedded to the hexagonal hole of the turning cover, and the hexagonal body portion is passed through the screw barrel and inserted in the hexagonal hole of the plug.

2. A hydraulic brake adjusting device, comprising:

a hydraulic cylinder having a hollow cavity and a bifurcation extending upwardly from one end thereof, a piston passing through the cavity of the hydraulic cylinder, a tube movably plugged inside the hollow cavity of the hydraulic cylinder and sleeved on an end of the rod portion having a blind hole, an elastic member sleeved on the piston and two ends thereof are respectively against the tube and the piston, and a push rod disposed between the piston and a handlebar, the hydraulic brake adjusting device characterized as:

the device further comprises an adjusting member, disposed at the end of the hydraulic cylinder away from the bifurcation, the adjusting member includes a plug and a screw barrel, the plug includes a convex portion, a shoulder portion, and an outer thread rod portion, the shoulder portion is disposed between the outer thread rod portion and the convex portion, the plug is disposed inside the end of the hydraulic cylinder adjacent to the second stop ring and against the second stop ring with the shoulder portion, the convex portion is against the end of the tube away from the elastic member, the screw barrel includes an inner threaded portion, a ring portion, and a hexagonal portion, and the inner threaded portion is screwed at the outer thread rod portion of the plug; and the adjusting member further comprises a turning cover and a transmission post, the turning cover is pivotably sleeved on the screw barrel, the turning cover includes a hexagonal hole, and the transmission post includes a hexagonal head portion and a hexagonal body portion connected to each other, the hexagonal head portion is embedded to the hexagonal hole of the turning cover, and the hexagonal body portion is passed through the screw barrel and inserted in the hexagonal hole of the plug.

\* \* \* \* \*